United States Patent
Chang

[19]

[11] Patent Number: 5,805,863
[45] Date of Patent: *Sep. 8, 1998

[54] MEMORY PATTERN ANALYSIS TOOL FOR USE IN OPTIMIZING COMPUTER PROGRAM CODE

[75] Inventor: Po-hua Chang, Saratoga, Calif.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 579,418

[22] Filed: Dec. 27, 1995

[51] Int. Cl.⁶ .................................................. G06F 15/18
[52] U.S. Cl. .......................................... 395/500; 395/709
[58] Field of Search .................................. 395/707, 709, 395/701, 703, 704, 708, 500

[56] References Cited

U.S. PATENT DOCUMENTS

| | | | |
|---|---|---|---|
| 4,991,088 | 2/1991 | Kam | 395/709 |
| 5,193,190 | 3/1993 | Janczyn et al. | 395/707 |
| 5,212,794 | 5/1993 | Pettis et al. | 395/709 |
| 5,303,377 | 4/1994 | Gupta et al. | 395/709 |
| 5,452,457 | 9/1995 | Alpert et al. | 395/709 |
| 5,457,799 | 10/1995 | Srivastava | 395/709 |
| 5,530,964 | 6/1996 | Alpert et al. | 395/709 |
| 5,579,520 | 11/1996 | Bennett | 395/704 |
| 5,581,762 | 12/1996 | Hayashi et al. | 395/709 |

*Primary Examiner*—Kevin J. Teska
*Assistant Examiner*—Dan Fiul
*Attorney, Agent, or Firm*—Blakely, Sokoloff, Taylor & Zafman

[57] ABSTRACT

A method of facilitating optimization of computer program code. The code includes instructions for performing a plurality of loops, with each loop including at least one memory reference. The program code is instrumented to cause a memory reference trace to be generated when the program code is executed. The loops in the program code are identified from the trace. For each loop, a plurality of performance parameters relating to the memory references contained within the loop, including dynamic memory usage information and cache statistics, are computed based on the information in the trace. The performance parameters are then applied to a plurality of sets of conditions. Each set of conditions corresponds to one of a plurality of known optimization techniques to determine whether each set of conditions is satisfied for each loop. The optimization techniques include loop transformations and data restructuring techniques. For each set of conditions that is satisfied for a particular loop, an output is generated identifying the optimization technique which corresponds to that set of conditions as a suggested optimization for the loop.

38 Claims, 3 Drawing Sheets

FIG_1

FIG_2

FIG._3A

FIG_3B

MEMORY PATTERN ANALYSIS TOOL FOR USE IN OPTIMIZING COMPUTER PROGRAM CODE

FIELD OF THE INVENTION

The present invention pertains to the field of computer software. More particularly, the present invention relates to a memory pattern analysis tool for assisting in the optimization of computer program code.

BACKGROUND OF THE INVENTION

An important aspect of designing computer software is optimization. Optimization generally refers to the process of improving computer program code by modifying the code to run faster, to use memory more efficiently, or both. Optimization is generally performed using two basic approaches: 1) code restructuring, and 2) data placement and restructuring. Several well-known code restructuring methods exist for improving the memory hierarchy performance of software, such as scalar replacement, loop interchange, loop distribution, loop fusion, loop blocking, unroll-and-jam, strip-mine-and preload, and strip-mine-and-interchange. These techniques can sometimes be combined to achieve an even higher level of performance. In addition, several well-known data placement and restructuring techniques exist for improving memory hierarchy performance, such as data alignment in COMMON block, padding and aligning structures, placing scalar variables on the same cache block, and array merging.

Existing technology for optimizing software has certain disadvantages, however. For example, a basic problem in optimizing software is determining which of the above optimization methods to apply to a given portion of code. Certain compilers are available which will automatically select and apply various loop transformations in order to restructure program code. However, in so doing, the compilers often determine and apply only certain transformations that are possible for a portion of code, not the transformations that are best suited, or even appropriate, for that portion of code. Consequently, the resulting optimization may be less than optimal. One reason for this deficiency is that the compilers do not have information describing the dynamic memory utilization of the program. Cache simulators have been developed which generate certain dynamic information, such as the number of cache hits and misses. However, cache simulators are limited to cache performance statistics, and the problem remains of determining which optimizations to apply. Further, the compilers do not focus on certain critical portions of the code that have a substantial impact on memory hierarchy performance, such as memory references which occur within loops. Hence, what is needed is a tool which overcomes these deficiencies, for assisting in the optimization of software.

SUMMARY OF THE INVENTION

A method of assisting optimization of computer program code including at least one memory reference is provided. Performance data relating to the memory reference is computed during execution of the program code. The performance data is applied to a number of sets of conditions, with each set of conditions corresponding to one of a number of optimization techniques. After determining if each set of conditions is satisfied, an output is generated, for each set of conditions that is satisfied, indicating that the corresponding optimization technique may be beneficial if applied to the program code.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method of assisting optimization of computer program code is described. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram form in order to avoid unnecessarily obscuring the present invention.

The present invention includes a memory pattern analysis tool that indicates which of a number of possible memory optimizations may be helpful if applied to a particular sequence of program code. The present invention is particularly useful in optimizing programs written in languages that are amenable to large numbers of loops, such as FORTRAN or C; however, the present invention is not limited to such languages.

The present invention includes method steps which, in the preferred embodiment, are embodied in computer software. These steps may be performed by a general-purpose processor programmed with instructions that cause the processor to perform the necessary steps. In alternative embodiments, the necessary steps may be performed by specific hardware components that contain hard-wired logic for performing the steps or any combination of programmed general-purpose computer components and customed hardware components.

Figure 1:
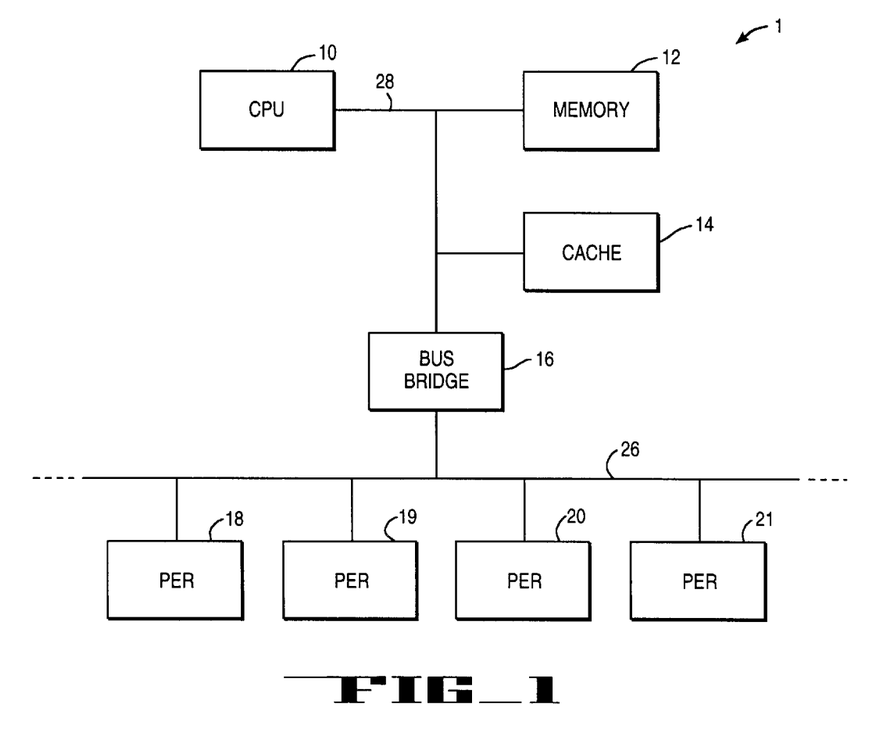
FIG. 1 is a block diagram of a computer system in which the present invention is implemented.

FIG. 1 illustrates a computer system 1 in which the present invention is implemented. The computer system 1 includes a central processing unit (CPU) 10 capable of performing instructions according to the present invention. The CPU 10 is coupled to a main memory 12 and a cache memory 14 by a system bus 28. A number of peripheral components 18–21 are coupled to a peripheral component interconnect (PCI) bus 26. The PCI bus 26 is connected to the system bus 28 by a bus bridge 16. The peripheral components 18–21 may include any of a number of commonly used input/output devices, such as a display monitor, a keyboard, a mouse or other cursor control device, and a magnetic disk drive, CD-ROM drive, or other mass storage device. In the preferred embodiment, instructions according to the present invention may be stored in memory 12 or on a magnetic disk, CD-ROM, or other mass storage device accommodated by one of the peripheral components 18–21, or any combination of these devices.

The present invention includes a method for identifying which of a number of possible optimization techniques may be beneficial for a given sequence of computer program code. It is assumed for purposes of this description that a program to be optimized contains a number of loops, and that a number of instructions within those loops contain memory references. A memory reference is defined herein as a reference made within an instruction to a location in memory, such that a load, store, or modify operation is performed within the CPU 10 when the instruction is executed. As will be described below in detail, the program to be optimized is initially instrumented by a compiler to cause certain predetermined information to be generated pertaining to each dynamic instance of a memory reference during execution of the program. Upon execution of the program, the trace is generated. From the trace, the loops in the program are identified. For each loop, a number of dynamic performance parameters are computed relating to the memory references occurring within that loop. These parameters include dynamic memory usage information and cache statistics. For each loop, these performance parameters are then applied to a number of sets of conditions. Each set of conditions is associated with a particular known memory optimization technique. A set of conditions forms the criteria for determining whether the corresponding optimization technique will likely be useful if applied to the program. An indication is generated, for each set of conditions that is satisfied, that the optimization corresponding to that set of conditions may be a beneficial. In addition, for each loop in the program, a list of the memory references contained within the loop is generated along with a listing of the computed performance parameters for each memory reference.

Figure 2:
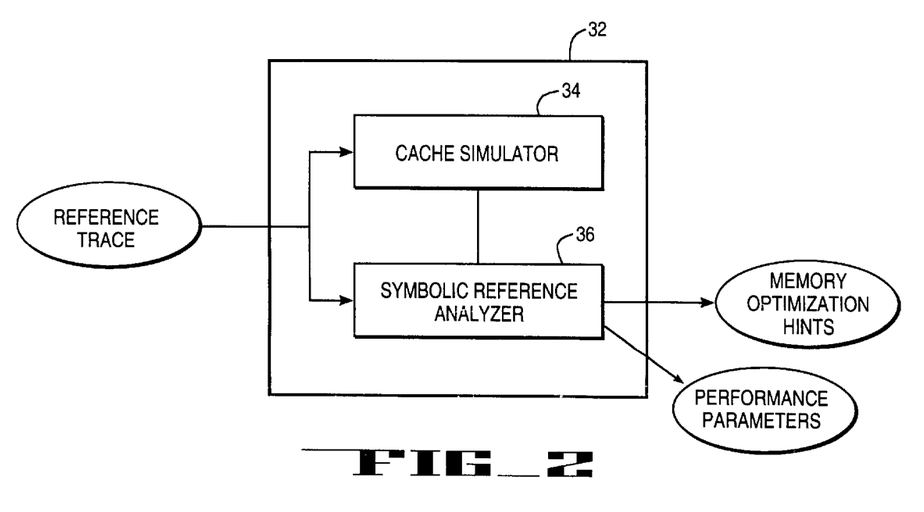
FIG. 2 is a block diagram of a memory pattern analysis tool.

FIG. 2 provides a block diagram of the memory pattern analysis tool 32. The tool 32 includes a cache simulator 34 that is logically coupled to a symbolic reference analyzer 36. In the preferred embodiment, the tool 32 is embodied in the form of a library file which is linked to the program to be optimized prior to execution of the program. During execution of the program, the tool 32 receives as input a memory reference trace generated as the program is executed and outputs memory optimization suggestions and the performance parameters mentioned above.

Figure 3A:
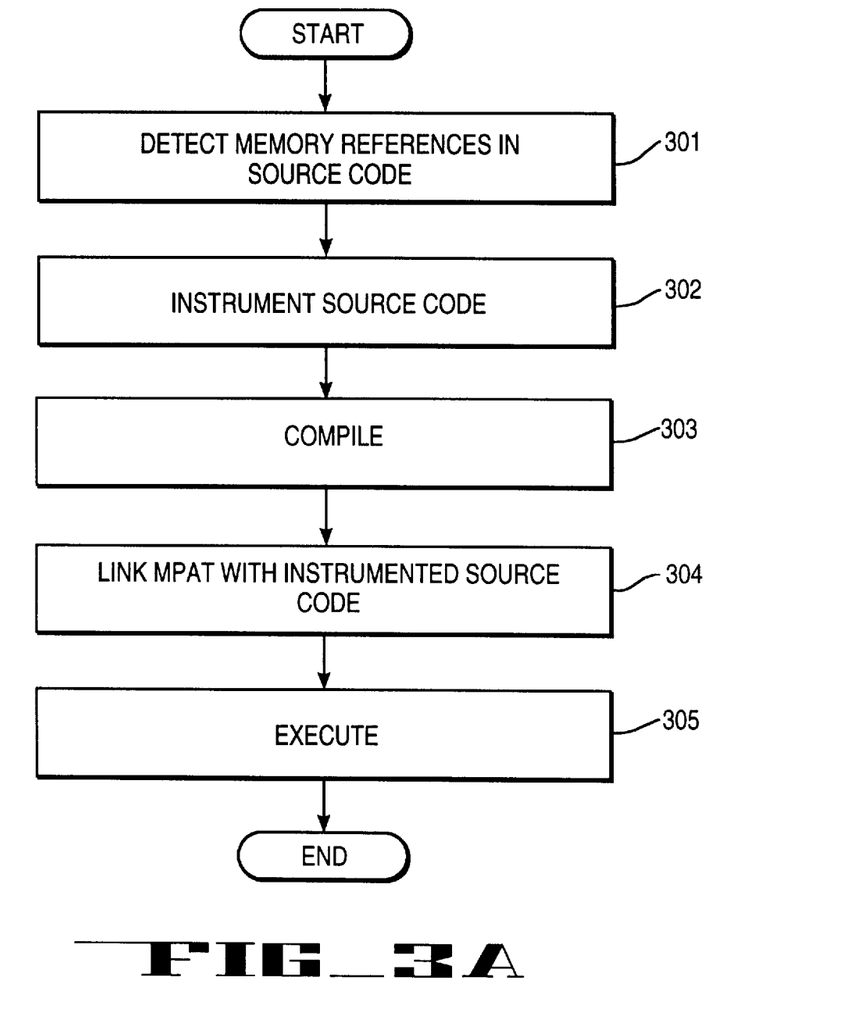
FIG. 3A is a flowchart showing steps for instrumenting, compiling, and linking a program to a memory pattern analysis tool.

Associated with the program to be optimized is a compiler for converting the program to object code. Referring now to FIG. 3A, the compiler first detects the memory references which are present in the source code (step 301). Next, the compiler instruments (i.e., inserts additional procedure code into) the source code (step 302) to configure the source code to generate a memory reference trace during execution. Specifically, the compiler configures the program to generate, during execution, a trace comprising one record for every dynamic instance of a memory reference. Each record includes the following information: 1) the instruction address of the instruction containing the memory reference; 2) the instruction type of the instruction containing the memory reference (i.e., load, store, or modify); 3) the memory address being accessed as a result of the memory reference; and 4) the location in the source code of the memory reference (file name, line number, and column number in which the memory reference appears). After the program is instrumented, the program is compiled (step 303) and linked with the tool 32, which is a library file (step 304), to produce an executable program. The program is then executed (step 305) in conjunction with a data set, causing both the memory reference trace to be generated and the tool 32 to be invoked as the program is executed.

Figure 3B:
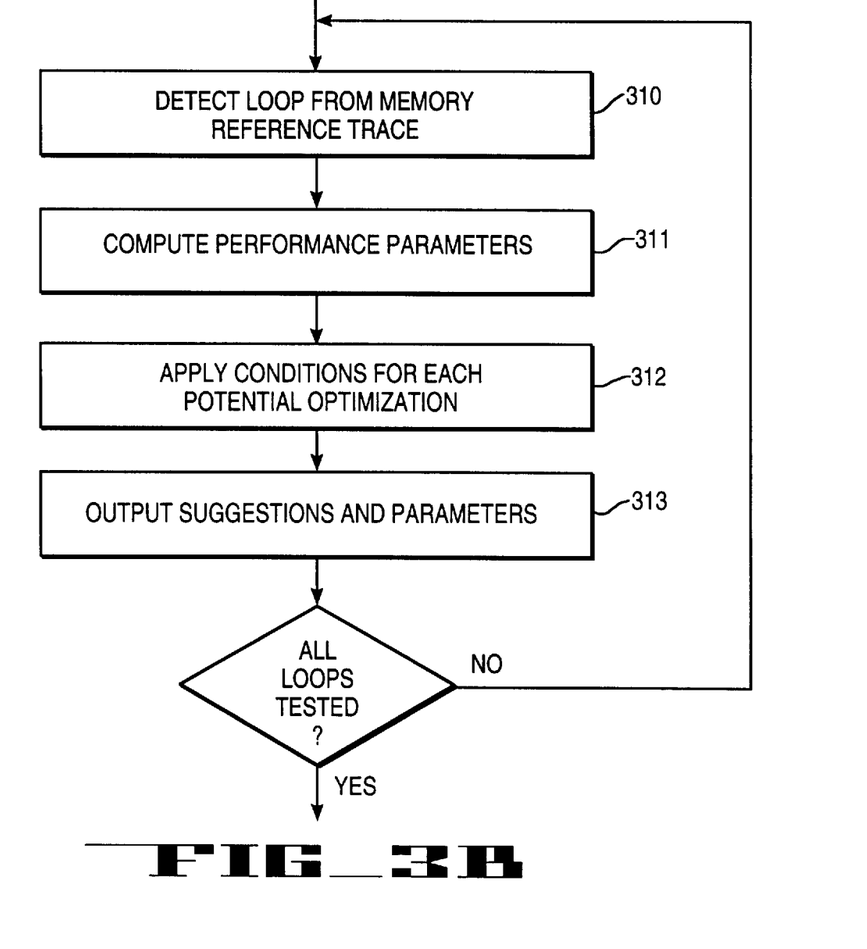
FIG. 3B is a flowchart illustrating the step of executing an instrumented program.

FIG. 3B is a flowchart illustrating the step of executing the program (step 305) in greater detail. First the individual loops in the program are detected from the memory reference trace using a loop detection algorithm (step 310). In the preferred embodiment, loop nests of up to two levels will be detected. Various loop detection algorithms are known and are suitable for this task.

After detection of the loops, a number of performance parameters are computed for each loop in the program (step 311). These performance parameters include cache statistics and other parameters which will be described below. The cache statistics are generated by the cache simulator 34 portion of the tool 32, while the other parameters are computed by the symbolic reference analyzer 36 portion. Various cache simulators are currently known and can be used to generate the cache statistics. An example of a suitable cache simulator is the CPROF program, developed at the University of Wisconsin.

A number of sets of conditions are provided, with each set of conditions being associated with a different known optimization technique. Each set of conditions represents criteria for determining whether the corresponding optimization technique will likely be useful if applied to the program. For each loop, the performance parameters are applied to each set of conditions (step 312). The tool 32 outputs a list including the memory references contained within the loop, certain ones of the performance parameters associated with each memory reference in the loop, and any optimizations for which the corresponding set of conditions has been satisfied (step 313).

Performance Parameters

During execution of the program, the tool 32 computes the performance parameters for each loop and stores these parameters in a data structure. The data structure has the following information and organization:

```
loop
      -> a list of sub-loops
      -> a list of nearby loops
      -> a list of references
      -> n
reference (maintained for each reference in the loop)
      -> min
      -> max
      -> x_stride
      -> x_is_constant_stride
      -> y_stride
      -> y_is_constant_stride
      -> x_length
      -> #cache_misses
      -> #cache_hits
      -> #non_aligned_accesses
      -> a list of relations
relation
      -> source reference
      -> destination reference
      -> same_x_stride_occurrences
      -> x_difference
```

The terms set forth in the data structure above are defined as follows:

A "sub-loop" is a loop contained within a loop.

A "nearby loop" is a loop that is located within a predetermined number of lines of source code of another loop.

A "list of references" is a list of the memory references contained within a loop.

"n" is the number of times a loop is iterated.

"min" is the minimum memory address that is made from a reference point (i.e., from the point in the program at which a reference occurs).

"max" is the maximum memory address that is made from a reference point.

"x_stride" is the change in memory address per inner loop iteration, divided by the reference size. The reference size is the number of bytes of memory occupied by the reference, which depends upon the data type of the reference. Dividing by the reference size puts x_stride in terms of array elements, as opposed to memory address space.

"x_is_constant_stride" is a Boolean variable which is TRUE only if x_stride is a constant.

"y_stride" is the change in memory address per outer loop iteration, divided by the reference size. As with X_stride, the reference size is the number of bytes of memory occupied by the reference, which depends upon the data type of the reference. Dividing by the reference size puts x_stride in terms of array elements, as opposed to memory address space.

"y_is_constant_stride" is a Boolean variable which is TRUE only if y_stride is constant.

"x_length" is the largest memory address difference of a reference in a loop invocation, divided by the reference size (to put X-length in terms of array elements).

"#cache_misses" is the number of cache misses. This parameter is computed buy the cache simulator 34.

"#cache_hits" is the number of cache hits. This parameter is computed buy the cache simulator 34.

"#non_aligned_accesses" is the number of non-aligned accesses that are made from the reference.

A "relation" is two references that appear in the same loop and have made the same change in x_stride.

A "source reference" is a reference of a relation which is read in performing a memory operation.

A "destination reference" is a reference of a relation which is written in performing a memory operation.

"same_x_stride_occurrences" is the number of times that two references have made the same change in x_stride.

"x_difference" is the constant (if defined) difference between memory addresses of two references.

Optimizations

In the preferred embodiment, conditions are provided for the following code restructuring optimizations: 1) scalar replacement, 2) loop interchange, 3) loop distribution, 4) loop fusion 5) loop blocking, 6) unroll-and-jam, 7) strip-mine-and-preload, and 8) strip-mine-and-interchange. In certain cases, a combination of one or more of the preceding transformations may be recommended. Loops having rectangular, triangular, and trapezoidal-shaped iteration space will be focused on for evaluating loop transformations. In addition, conditions are provided corresponding to the following data placement and restructuring optimizations: 1) data alignment and COMMON block, 2) padding and aligning structures, and 3) array merging.

1. Scalar Replacement

Two scenarios are considered for scalar replacement: 1) loops having loop-dependent dependencies, and 2) loops having loop-independent dependencies. The following code is an example of a loop-dependent dependency:

```
    do 10 I = 1,100
        A(I + 2) = A(I) + C(I)
    continue
```

The following set of conditions applies to loop-dependent dependencies:

(1) There are no non-constant stride references in the loop, and (2) There are references in the loop such that:

a) x_stride=1, x_stride'=1, b) x_difference/opr_size is a small constant <>0, and c) y_stride=y_stride'.

In the above set of conditions, and in each of the following sets of conditions, the following clarifications apply:

x_stride and y-stride apply to a given reference in a loop, while x_stride' and y-stride' apply to a different reference in the loop;

opr_size refers to the operand size; and

"a small constant" depends on the number of registers that are available and, in the preferred embodiment, is a constant less than or equal to four.

Hence, if the above conditions are satisfied, then the tool 34 will generate an output indicating that scalar replacement may be a beneficial transformation for the subject loop.

The following is an example of scalar replacement with loop-independent dependencies.

```
    do 10 I = 1,N
        do 10 J = 1,M
10          A(I) = A(I) + B(J)
becomes
    do 20 I = 1,N
    T = A(I)
        do 10 J = 1,M
10          T = T + B(J)
20      A(I) = T
```

If the following conditions are satisfied in the case of loop-independent dependences, then the tool 34 will generate an output indicating that scalar replacement may be a beneficial transformation for the subject loop:

(1) There are no non-constant stride references in the loop, and (2) There are references in the loop such that:

a) x_stride'=x_stride=0, b) y_stride'=y_stride <>0, and c) x_difference/opr_size=y_stride * a small constant.

The following is an example of loop interchange and scalar replacement:

```
    do 10 J = 1,N
        do 10 I = 1,N
            A(I) = A(I) + B(J,I)
```

If the following conditions are satisfied, then the tool 34 will generate an output indicating that loop interchange followed by scalar replacement may be a beneficial transformation for the subject loop:

(1) There are no non-constant stride accesses in the loop, and (2) There is at least one reference such that:

a) x_stride=small constant <>0, and b) y_stride=0,
and (3) There is no reference in the loop such that:

a) x_stride=1, and a) y_stride=n

The following is an example of unroll-and-jam and scalar replacement:

```
    do 10 J = 1,2*M
        do 10 I = 1,N
10          A(I,J) = A(I - 1,J) + A(I - 1, J - 1)
```

-continued

```
becomes
    do J = 1,2*M,2
        do 10 I = 1,N
            A(I,J) = A(I - 1,J) + (I - 1,J - 1)
10          A(I,J + 1) = A(I - 1,J + 1) + A(I - 1,J)
```

If the following conditions are satisfied, then the tool 34 will generate an output indicating that a combination of unroll-and-jam and scalar replacement may be a beneficial transformation for the subject loop:

(1) There are no non-constant stride references, in the loop, and (2) There are pair-wise references such that:

a) x_stride=x_stride', b) y_stride=y_stride'=a constant <>0, and c) x_difference/opr_size=(y_stride * a small constant) <>0

2. Loop Interchange

If the following conditions are satisfied, then the tool 34 will generate an output indicating that loop interchange may be a beneficial transformation for the subject loop:

(1) There are no non-constant stride references in the loop, and (2) There is at least one reference such that:

a) #cache_misses is high b) y_stride=1, c) x_stride=constant, d) x_stride <>0, and e) x_stride <>1.

3. Loop Distribution

If the following condition is satisfied, then the tool 34 will generate an output indicating that loop distribution may be a beneficial transformation for the subject loop: the loop has a number of non-interfering references that have high conflict misses (i.e., a miss ratio greater than 10%).

References "interfere" when the accessing of an array element of one reference causes a value of the other reference to be overwritten. One way of determining the existence of interfering references is to determine whether there is overlap between the two references, i.e., whether the highest address accessed by one reference is lower than the lowest address accessed by the other reference. However, it should be appreciated that overlap is only an indication of the possibility of interfering references and not an absolute test. A example of a function for computing interfering references based on overlap is as follows:

```
Interfere(ref1, ref2) {
    if (no_overlap(ref1.min, ref1.max, ref2.min, ref2.max))
        return FALSE;
    return TRUE;
}
``` where:

ref1 is a first reference in a loop, ref2 is a second reference in the loop, ref1.min is the lowest address accessed by the first reference, ref1.max is the highest address accessed by the first reference, ref2.min is the lowest address accessed by the second reference, and ref2.max is the highest address accessed by the second reference.

It should be appreciated that other functions for computing interfering references may also be used.

4. Loop Fusion

The following is an example of loop fusion:

```
for (i=0; i<N; i++)
    for (j=0; j<N; j++)
        a(i,j) = 1/b(i,j) * c(i,j);
for (i=0; i<N; i++)
    for (j=0; j<N; j++)
        d(i,j) = a(i,j) + c(i,j);
becomes
for (i=0; i<N; i++)
    for (j=0; j<N; j++) {
        a(i,j) = 1/b(i,j) * c(i,j);
        d(i,j) = a(i,j) = c(i,j);
    }
```

For loop fusion, any nearby loops to the subject loop are detected before applying the conditions. If the following conditions are satisfied, then the tool 34 will generate an output indicating that loop fusion may be a beneficial transformation for the subject loop:

(1) the subject loop and the nearby loop are of equal length (n is the same for the two loops), and (2) there are references in different loops that exhibit locality, i.e.:

a) x_stride'=x_stride <>0 b) y_stride'=y_stride, and c) overlap(ref1, ref2), where "overlap" is defined above with respect to loop fusion.

5. Loop Blocking

The following is an example of loop blocking:

```
do 110 J = 1, M
    do 110 K = 1, N
        do 110 I = 1, L
            C(I,K) = C(I,K) + A(I,J) * B(J,K)
110 continue
becomes
do 110 J = 1, M, 4
    do 110K = 1, N
        do 110 I = 1, L
            C(I,K) = C(I,K) +
                A(I,J) * B(J, K) +
                A(I, J+1) * B(J+1, K)+
                A(I, J+2) * B(J+2,K) +
                A(I,J+3) * B(J+3, K)
110 continue
```

If the following conditions are satisfied, then the tool 34 will generate an output indicating that loop blocking may be a beneficial transformation for the subject loop:

There is at least one reference for which:

a) x_stride=0, and b) y_stride=n * a small constant <>0 or,

1) There are no non-constant stride references, and

2) There is at least one reference such that:

a) x_stride=1, b) y_stride=(n * a small constant), c) x_length is large, d) #cache_miss rate is high, e) x_stride'=x_stride, f) y_stride'=y_stride, g) x_difference/opr_size=y_stride * a small constant <>0, and h) overlap(ref1, ref2).

6. Unroll-and-jam

If the following conditions are satisfied, then the tool 34 will generate an output indicating that loop unroll-and-jam may be a beneficial transformation for the subject loop:

(1) There are no non-constant stride references in the loop, and (2) There is a reference such that:

a) x_stride=1, b) y_stride=0, and c) the reference is in a loop nest of depth>1, or, 1) There are no non-constant stride references in the loop, and 2) there are pair-wise references such that:

a) x_difference/opr_size=y_stride * a small constant <>0, b) x_stride'=x_stride, and c) y_stride'=y_stride=(n * a small constant).

7. Strip-mine-and-preload

If the following conditions are satisfied, then the tool 34 will generate an output indicating that strip-mine-and-preload may be a beneficial transformation for the subject loop:

(1) There are no non-constant stride references in the loop, (2) There is a small number of references (e.g., less than or equal to four), and (3) for all references in the loop:

a) x_stride=1, and b) x_length is large (i.e., larger than the size of the cache).

8. Strip-mine-and-interchange

If the following conditions are satisfied, then the tool 34 will generate an output indicating that strip-mine-and-interchange may be a beneficial transformation for the subject loop:

(1) There are no non-constant stride references in the loop, (2) There is a small number of references in the loop, and (3) For all references:

a) x_stride=1, b) x_length is large (i.e., larger than the size of the cache), and c) y_stride=0 or n.

9. Data Alignment in COMMON Block

If the following conditions are satisfied, then the tool 34 will generate an output indicating that data alignment in COMMON block may be beneficial:

There are pair-wise references that:

a) x_difference <>0, and b) remainder ((x_difference/opr_size)/CACHE_SIZE)=0 or small constant, c) x_stride=x_stride'=1, d) y_stride=y_stride', e) x_length is large, f) x_length' is large, and g) there is a high cache miss ratio in the loop.

10. Padding and Aligning Structures

If the following condition is satisfied, then the tool 34 will generate an output indicating that padding and aligning structures may be beneficial: There are references that have large numbers of non-aligned accesses. What constitutes a "high number" may be determined according to the user's needs.

11. Array Merging

If the following conditions are satisfied, then the tool 34 will generate an output indicating that array merging may be beneficial:

In an inner loop, there are pair-wise references that:

(1) the last change in x_stride does not equal 1, and (2) the last change in x_stride equals the last change in x_stride', (3) rel->same_x_stride_occurrences/total>0.8, where total=#cache_hits+#cache_misses, and (4) x_stride <>0, x_stride <>1.

Output

For each loop, after all sets of conditions have been applied, the tool 32 outputs a list including the memory references contained within the loop, certain ones of the performance parameters associated with each memory reference in the loop, such as cache statistics, and any optimizations for which the corresponding set of conditions has been satisfied. In one embodiment, the output generated for each loop has the following information and format:

```
LOOP[loop-number]
    reference_name(memory instruction address)[source file
name, function name, line number, column number]
    MIN=min
    MAX=max
    X_STRIDE=x_stride
    NUM_CACHE MISSES=#cache_misses
    NUM_CACHE HITS=#cache_hits
    NUM_NON_ALIGNED ACCESSES=#non_aligned_accesses
    reference_name(memory instruction address)[source file
name, function name, line number, column number]
```

RECOMMENDED POTENTIAL LOOP TRANSFORMATIONS

[list of optimization techniques for which conditions have been met.]

Thus, an exemplary output might appear as follows:

```
LOOP[1]
    reference1(1638353829,541803)[example.c, main, 8, 10]
        MIN=138671840
        MAX=138712768
        X_STRIDE=8
        NUM_CACHE MISSES=1280
        NUM_CACHE HITS=0
```

-continued

```
        NUM_NON_ALIGNED ACCESSES=0
    reference2(163833829,534401)[example.c, main, 8, 14]
        MIN=138712800
        MAX=138753728
        X_STRIDE=8
        NUM_CACHE MISSES=1280
        NUM_CACHE HITS=0
        NUM_NON_ALIGNED ACCESSES=0
RECOMMENDED POTENTIAL LOOP TRANSFORMATIONS:
    array merging of references
        (example.c, main, 8, 10) and (example.c, main, 8, 14)
```

Note that, although only certain performance parameters such as cache statistics are output for each reference in the exemplary embodiment, all performance parameters or different selected performance parameters may be output in other embodiments, according to the user's needs.

Thus, a method of assisting optimization of computer program code has been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method of facilitating optimization of computer program code, the method comprising the steps of:
    applying performance data relating to execution of the program code to a plurality of sets of conditions, each set of conditions corresponding to one of a plurality of optimization techniques, to determine whether each set of conditions is satisfied; and
    for each set of conditions that is satisfied, generating an output identifying the corresponding optimization technique, said generating being independent of performance of said corresponding optimization technique.

2. A method according to claim 1, wherein the program code includes at least one memory reference, the method further comprising the step of generating the performance data, the performance data relating to the at least one memory reference.

3. A method according to claim 2, wherein the program code includes at least one loop, and wherein the step of generating the performance data comprises the step of generating performance parameters for each loop in the program code.

4. A method according to claim 3, further comprising the step of identifying each loop in the program code.

5. A method according to claim 3, wherein the step of generating performance parameters comprises the step of generating data representing dynamic memory access characteristics associated with the at least one memory reference.

6. A method according to claim 5, further comprising the step of simulating a cache memory to generate cache miss information, wherein the performance parameters further comprise cache miss information.

7. A method according to claim 1, wherein the program code includes at least one memory reference the method further comprising the step of providing a memory reference trace corresponding to an execution of the program code, the trace including data relating to each dynamic instance of the at least one memory reference during the execution of the program code.

8. A method according to claim 7, wherein the execution data comprises an instruction address, an instruction type, a memory address, and a location in the program code.

9. A method according to claim 7, further comprising the step of modifying the program code to cause the memory reference trace to be generated when the program code is executed.

10. A method according to claim 7, wherein the step of providing comprises the step of executing the program code to generate the memory reference trace.

11. A method according to claim 3, wherein the optimization technique is a loop transformation.

12. A machine-implemented method of identifying optimizations for computer program code, the code including instructions representing a plurality of loops, each loop including at least one memory reference, the method comprising the steps of:
    instrumenting the program code to cause a memory reference trace to be generated when the program code is executed, the trace to include information relating to each dynamic instance of said at least one memory reference during execution of the program code;
    executing the instrumented program code to generate the trace;
    identifying the loops in the program code from the trace;
    computing, for each loop, a plurality of performance parameters relating to the memory references contained within said loop based on the information on each said memory reference;
    applying the performance parameters to a plurality of sets of conditions, each set of conditions corresponding to one of a plurality of optimization techniques, to determine whether each set of conditions is satisfied for each loop; and
    for each set of conditions that is satisfied for a particular loop, outputting an indication identifying the optimization technique corresponding to said set.

13. A method according to claim 12, wherein the step of computing, for each loop, a plurality of performance parameters comprises the step of computing parameters representing dynamic memory usage characteristics associated with each memory reference.

14. A method according to claim 13, further comprising the step of simulating a cache memory to generate cache miss statistics, wherein the performance parameters further comprise cache miss statistics.

15. A computer system configured to facilitate memory optimization of a first sequence of computer program instructions, the first sequence of computer program instructions including one or more loops, each of the loops including one or more memory references, the computer system comprising:
    a processor; and
    a memory coupled to the processor, the memory having stored therein a second sequence of computer program instructions for configuring the processor to receive and use the memory reference trace to compute, for each memory reference, a plurality of performance parameters associated with execution of the first sequence of computer program instructions, the second sequence of computer program instructions further for configuring the processor to apply the performance parameters to a plurality of sets of conditions, each set of conditions corresponding to one of a plurality of optimization techniques, the second sequence of computer program instructions further for configuring the processor to output an indication, when one of the sets of conditions is satisfied, identifying the corresponding optimization technique as a recommended optimization technique wherein the outputting of the recommendation is independent of performance of the optimization technique.

16. A computer system according to claim 15, wherein the memory reference trace includes, for each memory reference, an instruction address, an instruction type, a memory address, and a source location.

17. A computer system according to claim 15, wherein the second sequence of computer program instructions is further for configuring the processor to simulate a cache memory and to compute cache performance parameters for the code.

18. A device for facilitating memory optimization of computer code, the code including one or more loops, each of the loops including one or more memory references, the apparatus comprising:

means for computing a plurality of performance parameters relating to the memory references during execution of the program code;

means for applying the performance parameters to a plurality of sets of conditions, each set of conditions corresponding to one of a plurality of optimization techniques, to determine whether each set of conditions is satisfied; and means for generating an output, for each set of conditions that is satisfied, identifying the corresponding optimization technique as a recommended optimization such that said identifying is independent of performance of said optimization technique.

19. A device according to claim 18, wherein the program code includes at least one loop, and wherein the means for computing performance data comprises means for computing a plurality of performance parameters for each loop.

20. A device according to claim 19, further comprising means for identifying each loop in the program code.

21. A device according to claim 18, wherein the performance parameters comprise parameters for indicating dynamic memory access characteristics associated with each memory reference.

22. A device according to claim 18, wherein the performance parameters further comprise cache miss information.

23. A device according to claim 18, further comprising means for providing a memory reference trace corresponding to an execution of the program code, the trace including data relating to each dynamic instance of a memory reference during the execution of the program code.

24. A device according to claim 23, wherein the data comprises an instruction address, an instruction type, a memory address, and a location in the program code.

25. A device according to claim 23, further comprising means for modifying the program code to cause the memory reference trace to be generated when the program code is executed.

26. A device according to claim 25, wherein the means for providing comprises means for executing the program code to generate the memory reference trace.

27. A program storage device readable by a machine, the storage device tangibly embodying a sequence of instructions executable by the machine to perform method steps for assisting optimization of computer program code, wherein the program code may include a plurality of memory references, the method steps comprising the steps of:

computing performance data relating to the memory references during execution of the program code;

applying the performance data to a plurality of sets of conditions, each set of conditions corresponding to one of a plurality of optimization techniques, to determine whether each set of conditions is satisfied; and generating an output, for each set of conditions that is satisfied, indicating that the corresponding optimization is recommended for the program code, said generating being independent of performance of said optimization.

28. A program storage device according to claim 27, wherein the program code may include at least one loop, and wherein the step of computing performance data comprises the step of computing a plurality of performance parameters for each loop in the program code.

29. A program storage device according to claim 28, wherein the method steps further comprise the step of identifying each loop in the program code.

30. A program storage device according to claim 27, wherein the performance parameters comprise parameters for indicating dynamic memory access characteristics associated with each memory reference.

31. A program storage device according to claim 27, wherein the method steps further comprise the step of simulating a cache memory.

32. A program storage device according to claim 31, wherein the performance parameters further comprise cache miss information.

33. A program storage device according to claim 27, wherein the method steps further comprise the step of providing a memory reference trace corresponding to an execution of the program code, the trace including execution data relating to each dynamic instance of a memory reference during the execution of the program code.

34. A program storage device according to claim 33, wherein the execution data comprises an instruction address, an instruction type, a memory address, and a location in the program code.

35. A program storage device according to claim 33, wherein the method steps further comprise the step of modifying the program code to cause the memory reference trace to be generated when the program code is executed.

36. A program storage device according to claim 33, wherein the step of providing comprises the step of executing the program code to generate the memory reference trace.

37. An apparatus for identifying optimizations for computer program code, the code including instructions for performing a plurality of loops, each loop including at least one memory reference, the method comprising the steps of:

means for identifying the loops in the program code;

means for computing performance information relating to each loop, the performance information including dynamic memory access information on the memory references associated with each loop;

means for applying the performance information to a plurality of sets of conditions, each set of conditions corresponding to one of a plurality of optimization techniques, to determine whether each set of conditions is satisfied for each loop; and means for outputting an indication, for each set of conditions that is satisfied, identifying the corresponding optimization technique as a suggested optimization for said loop, wherein said outputting is independent of performance of said optimization technique.

38. An apparatus according to claim 37, further comprising means for simulating a cache memory to generate cache miss information relating to execution of the program code, the performance information further including the cache miss information.

* * * * *